United States Patent [19]

Rohrle et al.

[11] Patent Number: 5,695,403
[45] Date of Patent: Dec. 9, 1997

[54] TORSION DAMPER OF REDUCED AXIAL SIZE, ESPECIALLY FOR A MOTOR VEHICLE

[75] Inventors: Dieter Rohrle, Montmorency; Ciriaco Bonfilio, Clichy, both of France

[73] Assignee: Valeo, Paris Cedex, France

[21] Appl. No.: 507,305

[22] PCT Filed: Dec. 19, 1994

[86] PCT No.: PCT/FR94/01482

§ 371 Date: Sep. 18, 1995

§ 102(e) Date: Sep. 18, 1995

[87] PCT Pub. No.: WO95/17614

PCT Pub. Date: Jun. 29, 1995

[30] Foreign Application Priority Data

Dec. 23, 1993 [FR] France .................. 93 15571
Jun. 30, 1994 [FR] France .................. 94 08324

[51] Int. Cl.⁶ ............................................ F16D 3/80
[52] U.S. Cl. .................. 464/24; 192/213.3; 464/67
[58] Field of Search ........................ 464/24, 66, 67, 464/68; 192/55.61, 214, 214.1, 213.3, 213.31; 74/574

[56] References Cited

U.S. PATENT DOCUMENTS

| 4,782,933 | 11/1988 | Jackel et al. ........... 192/55.61 X |
| 5,042,632 | 8/1991 | Jackel ........... 192/55.61 X |
| 5,301,780 | 4/1994 | Jackel ........... 464/68 X |
| 5,367,920 | 11/1994 | Bonfilio ........... 192/213 X |
| 5,377,796 | 1/1995 | Friedmann et al. ........... 464/68 X |
| 5,518,100 | 5/1996 | Birk et al. ........... 464/67 X |

FOREIGN PATENT DOCUMENTS

| 529669 | 3/1993 | European Pat. Off. . |
| 2593871 | 8/1987 | France . |
| 3721712 | 1/1988 | Germany . |
| 2186344 | 8/1987 | United Kingdom . |
| 2219647 | 12/1989 | United Kingdom . |
| 2251284 | 7/1992 | United Kingdom . |
| 2262587 | 6/1993 | United Kingdom . |

Primary Examiner—Daniel P. Stodola
Assistant Examiner—Eileen A. Dunn
Attorney, Agent, or Firm—Longacre & White

[57] ABSTRACT

A torsion damper comprising a first rotating element (12) and a second rotating element (14), coaxial with each other and defining between them an annular housing which receives a resilient damping device (32), wherein the greater part of the annular housing (30) is delimited by at least two components (20, 22, 24) of a first one (12) of the two rotating elements. The second (14) rotating element includes a plate (26) together with an annular disc (36) which is fixed to the plate by a set of rivets (39) arranged circumferentially in the vicinity of the inner peripheral edge of the disc (36), and having an annular friction damper system (174) arranged between the first rotating element (12) and the disc (36) of the second rotating element (24). The annular friction damping system (174) is disposed radially outwardly of the zone occupied by the rivets (39) by which the disc (36) is fixed, and radially inwardly with respect to the sealed annular housing (30).

8 Claims, 4 Drawing Sheets

TORSION DAMPER OF REDUCED AXIAL SIZE, ESPECIALLY FOR A MOTOR VEHICLE

BACKGROUND OF THE INVENTION

1. Field of the Invention

The present invention relates to a torsion damper, especially for a motor vehicle, such as that described and shown for example in the document U.S. Pat. No. 4,782,933.

More particularly, the invention relates to a torsion damper, especially for a motor vehicle, comprising a first rotating element and a second rotating element, coaxial with each other, which define between them an annular housing extending radially outwardly, which receives a lubricated, circumferentially acting, resilient damping device which works between the two rotating elements, being of the type in which the greater part of the annular housing is defined by at least two components of a first one of the two rotating elements, in which the second one of the two rotating elements comprises a plate and an annular disc fixed to the plate by a set of fastening members, for example rivets, arranged circumferentially in the vicinity of the inner peripheral edge of the disc, and being also of the type comprising an annular frictional damping system arranged between the first rotating element and the disc of the second rotating element.

2. Description of the Prior Art

The document U.S. Pat. No. 4,782,933 describes and shows a design of this type, in which the complementary friction damping device is disposed radially inwardly and surrounds the hub of the first rotating element, which comprises a machined cylindrical surface for engagement with some components of the friction damping device.

In addition, the friction damping device is disposed axially between the rolling bearing which is interposed between the hub of the first rotating element and the plate-shaped element of the second rotating element, and between an annular surface portion in facing relationship to the plate of the first rotating element.

This arrangement imposes a substantial increase on the axial size of the central portion of the first rotating element, and makes it necessary to increase substantially the length of the fastening screws by which the torsion damper is fastened on to the crankshaft of the vehicle, and which extend through the hub of the first rotating element.

It is desirable to reduce the axial size of the torsion damper in the region of the central hub, in order to increase the robustness of the torsion damper and to be able to reduce the length of the fastening screws, so as to make available more space for the clutch friction wheel of the clutch which is associated with the torsion damper (the disc 9 in FIG. 1 of the document U.S. Pat. No. 4,782,933), so as to make additional space available for the accommodation of the clutch friction wheel and/or to avoid deformation of the central portion of this last-mentioned element, for the purposes of providing space in which the fastening heads of the screws by which the torsion damper is secured on the crankshaft are located.

An object of the present invention is to propose a torsion damper which enables these drawbacks to be overcome and these desirable ends to be achieved.

SUMMARY OF THE INVENTION

With this in view, the invention proposes a torsion damper of the type mentioned above, characterised in that the greater part of the annular frictional damping system is disposed radially outwardly of the zone occupied by the fastening members of the disc, and radially inwardly with respect to the sealed annular housing, and in that the frictional damping system is partly carried by a component, in the form of a plate, of the first rotating element.

By virtue of such an arrangement, it is possible to reduce substantially the axial length of the hub, because no component of the friction damping device is any longer disposed between the rolling bearing and the plate shaped element of the first rotating element.

In addition, there is no need to machine the first rotating element in the vicinity of its hub, because the damping device is not fitted at that level.

Because of this arrangement, more material can be added so that the root zone of the hub is more robust. In addition, it is possible to bring the rolling bearing closer, and thus to increase the distance between the friction surface of the second rotating element and the rolling bearing, thus improving the evacuation of heat.

The rolling bearing will thus be cooler under severe operating conditions.

In addition, fitting is simplified, since the friction damping device is carried mainly by the first rotating element, and is mostly located radially outwardly of the members by which the disc is fastened. The damping system is independent of the bearing which is interposed between the two rotating elements.

In accordance with other features of the invention:

the friction damping system is partly carried by a component in the form of a plate of the first rotating element, which, for this purpose, comprises a sleeve which projects axially from the inner surface of the plate that faces towards the disc of the second rotating element, and which defines an internal bore in which components of the frictional damping device are arranged;

the inner radial edge of the disc of the second rotating element has a first set of radial lugs, arranged at regular intervals circumferentially and through which there pass the bodies of the fastening members by which the disc is fastened on the plate of the second rotating element;

the first rotating element comprises a hub which defines an engagement surface for the inner ring of a rolling bearing, the outer ring of which is received in an engagement surface formed in a central sleeve portion of the plate of the second rotating element;

the inner radial edge of the disc of the second rotating element has a second set of radial lugs spaced apart circumferentially between the fastening lugs of the first set, and which cooperate with the radial end surface, in facing relationship therewith, of the outer ring of the rolling bearing, so as to locate the latter axially in the central sleeve portion of the plate of the said rotating element;

the fastening members are rivets;

the fastening members are screws;

the heads of the fastening members cooperate in a simple and inexpensive manner with a rotating component of the friction damping system, for actuation of the latter by the second rotating element and for creating friction;

in axial cross section, the disc of the second rotating element has a sinuous profile including a bend which follows, with a clearance, the profile of the end portion of the sleeve which projects on the inner face of the plate of the first rotating element;

the disc comprises, on either side of the bend, a flat first annular portion which extends into the said sealed annular housing, together with a flat second annular portion;

the said fastening lugs are press-formed in the said flat annular second portion;

the said locating lugs are offset axially with respect to the plane of the said flat second annular portion;

the said first and second flat portions are substantially coplanar;

the hub is joined to the inner surface of the plate of the first rotating element through a rounded junction zone;

the hub is made in one piece integrally with the plate of the first rotating element;

the hub is made partly in the form of a member attached on the plate of the first rotating element;

the damper consists of a torsion damped flywheel for a motor vehicle, the first rotating element of which comprises a plate which is adapted to be mounted in rotation on the internal combustion engine of the motor vehicle, while its second rotating element is adapted to be mounted in rotation on the input shaft of the gearbox, and the plate of the first rotating element carries at its outer periphery an axially oriented skirt portion, at the free end of which there is sealingly fixed a disc which extends radially inwardly, so that the greater part of the annular sealed housing is bounded by the said plate, the skirt portion and the disc, while the disc of the second rotating element is fixed to a plate which constitutes the reaction plate of a clutch.

It will be appreciated that the junction of the plate of the first rotating element with its hub, in one or two parts, can take the form of a rounded zone or other forms, that is to say with material added as compared with the arrangement in the document U.S. Pat. No. 4,782,933, because in this location no machining has to be carried out. Thus the assembly consisting of the plate and hub is more robust.

It will be appreciated that the sinuous profile of the disc of the second rotating element avoids any increase in the axial size of the torsion damper, and enables the available space to be made use of.

It will be noted that the sleeve associated with the friction damping device can easily be made by moulding, and that the fitting of the double flywheel is simplified because the damping device is mostly carried by the first plate.

This arrangement enables the friction ring which is included in the said damping device to be easily stored prior to assembly. In addition, it is possible to make use of the sleeve as a mounting for a sealing ring.

Further features and advantages of the invention will appear on a reading of the detailed description which follows, for an understanding of which reference is made to the attached drawings, in which:

DETAILED DESCRIPTION OF THE PREFERRED EMBODIMENT

Figure 1:
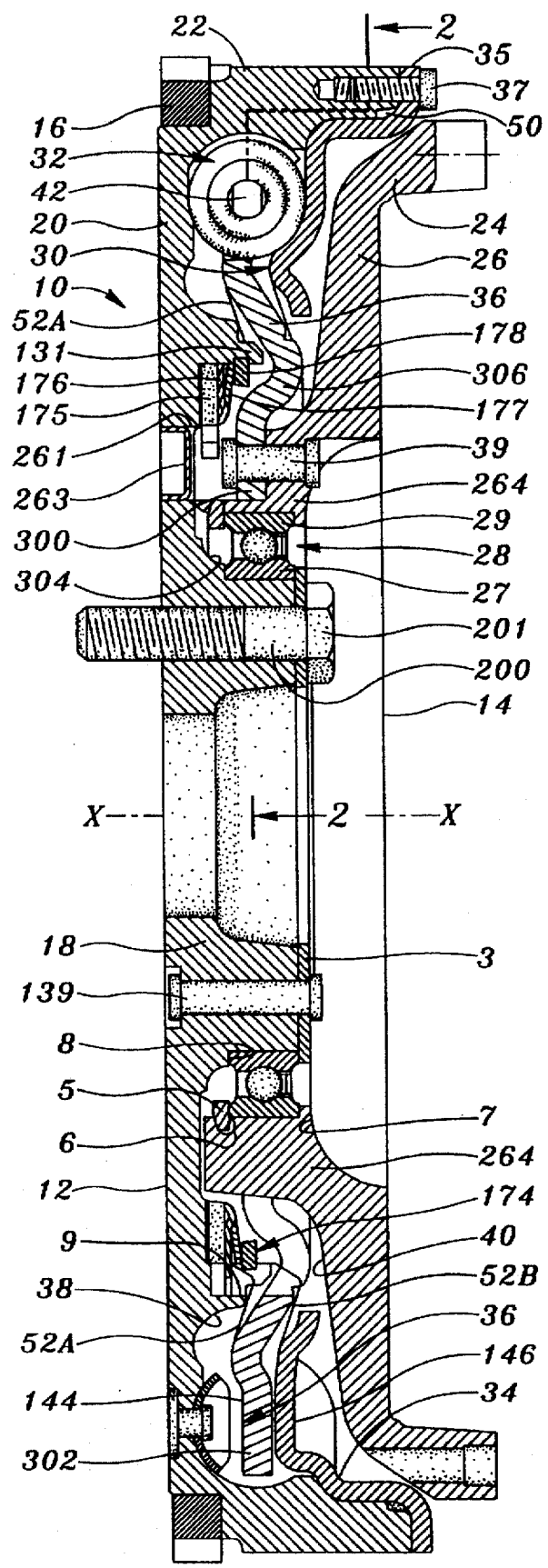
FIG. 1 is a view in axial cross section, taken on the line 1—1 in FIG. 2, which shows a first embodiment of a torsion damper in accordance with the invention.
Figure 2:
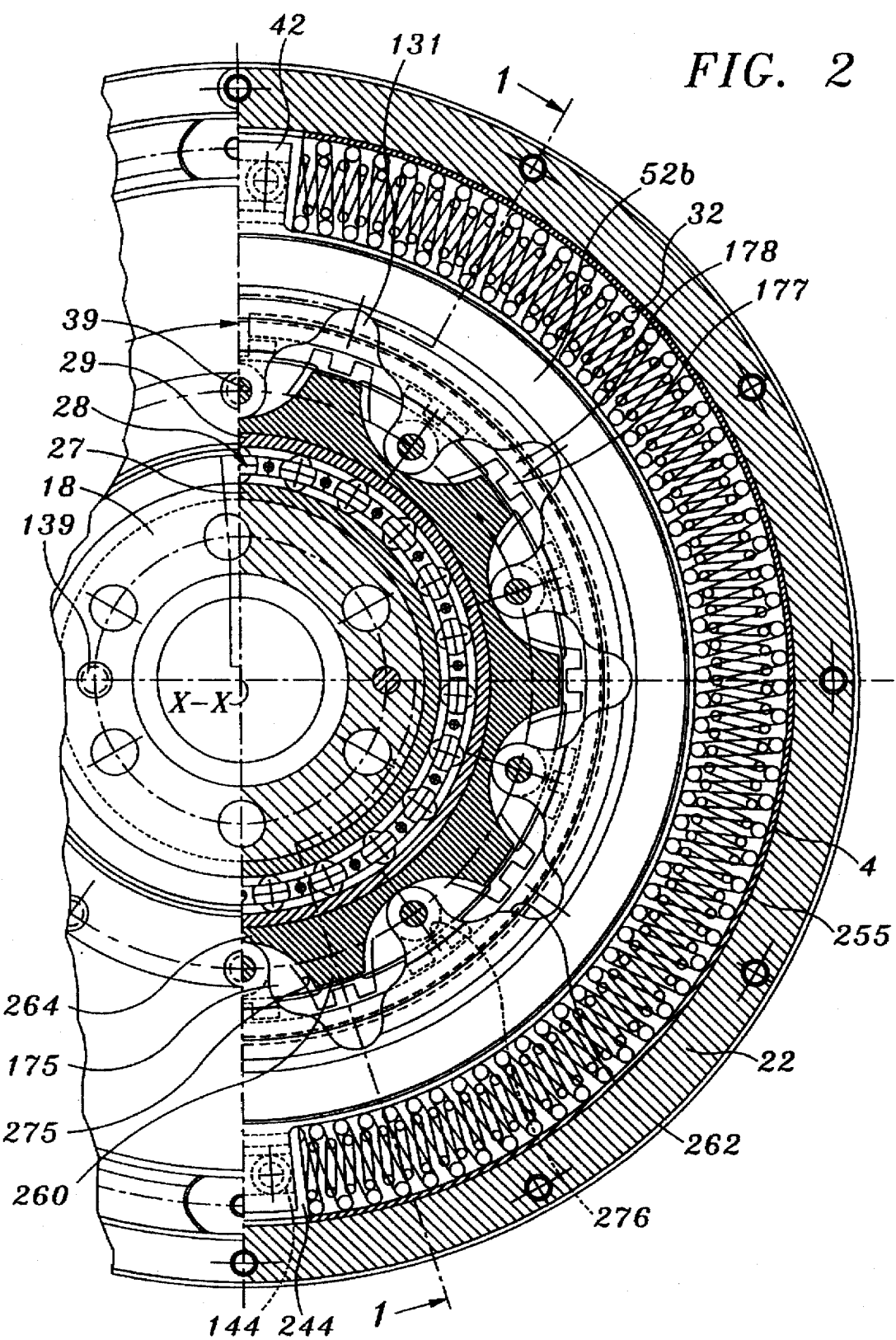
FIG. 2 is a side elevation shown partly in axial cross section taken on the line 2—2 in FIG. 1.

FIGS. 1 and 2 show a torsion damper in the form of a damped flywheel 10 for a motor vehicle, which consists essentially of a first rotating element 12 and a second rotating element 14, which are adapted for rotational movement of one with respect to the other about an axis X—X, against the action of a circumferentially acting resilient damping device 32 which works between the rotating elements 12 and 14.

The said resilient damping device 32 is mounted in an annular housing 30 defined by the two rotating elements. In this example, the annular housing 30 is bounded mainly by the first rotating element 12, and the second rotating element 14 comprises a disc 36, which penetrates into the annular housing 30.

In the drawings, the first rotating element 12, which has the general form of a plate, carries an external toothed crown 16 which is arranged to coooperate with the starter of the vehicle (not shown), together with a central hub 18 which is arranged to be fixed on the end of the crankshaft (not shown) of the internal combustion engine of the vehicle, typically by means of studs 200.

The first rotating element 12 consists essentially of a plate 20 and an axially orientated cylindrical peripheral annular skirt portion 22, which partly surrounds a cylindrical peripheral annular skirt portion 24 that forms an axial extension of the main portion, in the form of a plate 26, of the second rotating element 14, which is mounted for rotation on the hub 18 through a bearing 28, which is here in the form of a ball bearing.

The skirt portions 22 and 24 are integral with their associated plates 20, 26.

The plate 26 constitutes the reaction plate of a clutch in the manner described and shown in the document U.S. Pat. No. 782,933.

It will be recalled that the clutch also includes a clutch friction wheel which is fitted with friction liners at its outer periphery, together with a pressure plate which is typically acted on by a diaphragm that bears on a cover plate fixed on the free end of the skirt portion 24 of the mass 14.

The clutch friction wheel is coupled to a hub, which is mounted on the input shaft of the gearbox for rotation with it. When the clutch is engaged, the friction liners of the clutch friction wheel are gripped between the pressure and reaction plates of the clutch, so that the torque is transmitted from the engine to the input shaft of the gearbox.

In order to disengage (declutch) the clutch, the diaphragm is acted on by pulling or pushing on the ends of the fingers of the said diaphragm, so as to release the friction liners of the clutch friction wheel as described in the document U.S. Pat. No. 4,782,933.

The damped flywheel, which is commonly referred to as a double damped flywheel, thus comprises two coaxial masses, namely the first rotating element 12 and the second rotating element 14, which are mounted for rotation of one with respect to the other, the first mass 12 being mounted on the internal combustion engine of the vehicle for rotation with it, while the second mass 14 is arranged to be mounted, through the clutch, on the input shaft of the gearbox for rotation with that shaft.

The masses 12, 14 are mounted for rotation of one with respect to the other against the action of the circumferentially acting damping device 32, and against at least one complementary friction means 174 which works axially between the two masses.

The plates 20, 26 and the skirt portions 22 and 24 define an external annular housing 30, which is arranged to receive the resilient damping device 32, which consists in this example of a set of concentric helical springs, acting circumferentially and arranged in annular sectors. These springs extend generally over an angle of 180° in this example.

The first rotating element 12 also includes an internal radial disc 34, which extends radially from the skirt portion 22 towards the axis X—X of the assembly. The greater part of the housing 30 is thus bounded by the components 20, 22, 34, which in this example are part of the first rotating element 12.

To this end the disc 34 is coupled in rotation to the external skirt portion 22. This disc 34 has a sinuous profile in axial cross section, and it is extended at its outer periphery by an axially orientated annular flange which is in contact with the inner periphery of the skirt portion 22, and by a radial flange 35 which forms an extension of its axial flange.

This radial flange 35 is in contact with the free end of the skirt portion 22. It is formed locally with holes for the passage, through the latter, of screws 37 for fastening it to the skirt portion 22, the flange 35 thus constituting a fastening flange.

The second rotating element 14 includes a disc 36, which extends radially outwards and which is coupled to it in rotation by means of rivets 39 through a radially oriented, flat, annular zone 300. The disc 36 has a radially oriented, planar, annular zone 302 which extends radially into the housing 30 defined at the outer periphery of the damped flywheel. The disc 36 also extends into the central annular space defined between flat surface portions 38 and 40, in facing relationship with each other, of the plates 20 and 26.

The sealed annular housing 30 is also partly defined internally by the disc 36, and constitutes a cavity, which in this example is partially filled with grease for lubricating the springs of the resilient device 32, so as to prolong the useful working life of the damper while improving its operation. The disc 36 in this example, like the disc 34, is of metal, and is made by blanking and press forming.

Within the sealed housing 30, the outer edge of the disc 36 includes external radial lugs 42 which are arranged to act as end abutments, for engagement with the circumferential ends of the concentric coil springs of the resilient device 32.

The lugs 42 of the disc 36 lie between abutment elements 144 of the plate 20, in facing relationship with each other, and abutment elements 146 of the disc 34 of the rotating element 12, in facing relationship with each other.

The abutment elements 144, 146 serve to engage the circumferential ends of the springs of the resilient device 32. More precisely, thrust inserts 244 are interposed between the springs of the resilient means 32 and the abutment elements 144, 146. These thrust inserts 244 have central heads which penetrate, in a manner known per se, into the interior of the central spring, so as to support the springs. The said abutment elements are defined, respectively, by metallic members 144, which are sealingly fastened to the plate 20 by riveting, and by local press-formed deformations 146 in the disc 34. In the lower part of FIG. 1, the springs of the resilient device 32 have been omitted so that the abutment elements 146, 144 can be better seen.

Accordingly, the plate 20 and the disc 34 constitute guide rings for the springs of the resilient device 32, while the disc 36 includes a damper plate 302 penetrating between the plate 20 and the disc 34.

In the well known way, during relative movement between the two masses 12 and 14, the lugs 42 act on the springs of the resilient device 32, the circumferential ends of which are in abutment, through the thrust inserts 244, on the abutment elements 144, 146, so that the concentric springs are compressed.

The housing 30 also supports the coil springs of the resilient device 32 radially, with anti-wear members 255, of a chute-like shape, being interposed between the springs and the inner periphery of the skirt portion 22.

It will be noted that the plate 20 is dished in the region of the resilient device 32, so as to accommodate the springs of the resilient means.

The plates 20 and 26, with their skirt portions 22 and 24, are preferably made by a moulding process, the plate 26 being typically in the form of a casting.

The annular housing 30, which is open inwardly, is sealed by means of an O-ring seal 50, which is interposed between the inner periphery of the skirt portion 22 and the fastening flange 35 of the disc 34, and by means of two rings 52A and 52B which are disposed on either side of the disc of the second rotating element 14.

In the fitted position, each ring 52A, 52B is in axial compression, directly between a support surface of the first rotating element 12 and a second support surface which is part of the disc 36 of the second rotating element 14.

In the embodiment shown in FIGS. 1 and 2, the central hub 18 is made integrally in one piece with the plate 20.

The inner ring 27 of the rolling bearing 28 is located axially, firstly at the front, by means of a shoulder 8 formed on the otuer periphery of the hub 18, integral with the palte 20 of the first mass 12, and secondly at the rear, by means of a ring 3 which is secured by rivets 139 on the free end of the hub 18. This ring 3 serves for engagement of the heads 201 of the fastening studs 200.

The outer ring 29 of the rolling bearing 28 is located axially, firstly at the rear, by means of a shoulder 7 of the second rotating mass, and secondly at the front, by means of a split ring 5, the outer periphery of which defines a wedge in a front face having a conical engagement surface, for cooperation with a complementary conical engagement surface formed in a groove 6, in which the ring 5 is fitted.

This groove 6 is formed in an axially oriented, annular, cylindrical sleeve portion 264, which is made integrally in one piece with the reaction plate 26, and which extends towards the plate 20.

The rear face of the ring 5 is flat, for cooperation with the corresponding radial surface of the outer ring 29 of the rolling bearing 28.

This arrangement makes the reaction plate 26 more strong. In this connection, the ring 5 can also be fitted behind the outer ring 29 of the bearing 28, but in this case stress raisers can occur. By fitting the ring 5 at the front, these risks are reduced. In addition, this enables the axial thickness of the reaction plate 26 to be reduced, as can best be seen in FIG. 1, with the benefit of a general reduction in the axial size of the damper.

To this end, and in accordance with the invention, the friction damping device 174 is disposed radially outwardly of the ring 5, and in this example outside the zone occupied by the rivets 39 by which the disc 36 is fastened on the plate 26, and radially inwardly with respect to the annular housing 30 and with respect to the rings 52A and 52B.

The annular frictional damping device 174 is thus arranged around the central sleeve portion 264 of the plate 26.

It will be noted that the rolling bearing 26 is offset axially with respect to the friction surface of the reaction plate 26.

By virtue of the inventions, this offset is greater than that which is shown in the document U.S. Pat. No. 4,782,933, due to the fact that it is possible to shorten the hub 18 because the device 174 is mounted internally.

There is therefore improved evacuation of heat, and the rolling bearing 26 is thus cooler. In addition, the assembly consisting of the plate 20 and hub 18 is more strong, since the hub 18 is shortened.

The axially acting, annular frictional damping device 174 comprises, considered in axial succession going from the plate 20 to the plate 26, a friction ring 175, a spacer ring 176, an axially acting resilient ring 177, and a circlip 178.

The ring 177 is of the Belleville ring type, and it bears on the circlip 178 so as to act on the ring 176 and grip the ring 175 between the plate 20 and the ring 136.

To this end, in accordance with the invention, the plate 20 has, radially outside the rivets 39 by means of which the disc 36 is fastened to the plate 26, an axially oriented flange portion in the form of a cylindrical, annular sleeve 131, which is directed towards the disc 36. The flange portion 131 has an internal bore having a groove in which the circlip 178 is fitted.

The internal bore of the flange portion 131 has grooves 9, the base of which is closed by the plate 20.

The metallic ring 176 has at its outer periphery tenons in the form of radial lugs, for complementary engagement in the grooves 9.

The ring 176 is thus coupled in rotation, with axial mobility, to the plate 20 by mating cooperation of the tenon and mortice type.

Two grooves 9, diametrically opposed to each other, are provided in the embodiment shown in the drawings.

It will be noted that the Belleville ring 177 has internal radial fingers, directed towards the centre and penetrating between two consecutive bosses which are made by press forming the ring 176 at its inner periphery.

The ring 177 is thus prevented from rotating by mating cooperation of its fingers with the bosses of the ring 176, which is usually referred to as an application ring.

The ring 175 has, at its inner periphery, slots 275, 276 respectively, for accommodating axially orientated tenons 260 which are formed on the reaction plate 26 between two consecutive rivets 39, so as to give access to the heads of the rivets 39.

The ring 175 is offset axially with respect to the heads of the rivets 39, and, because of the slots 276 which are open radially outwardly, it is possible to pass the fastening tool through the apertures 261 which are formed in the plate 20 for this purpose, so as to fix the disc 36 to the plate 26 by riveting.

The holes 261 are subsequently closed by means of plugs 263. The slots 275, which are open radially inwards, constitute mortices through which the tenons 260 pass with a circumferential clearance.

It will be appreciated that these tenons can easily be made by a milling operation, and this is why they have circular lateral edges. The tenons 260 project radially with respect to the rivets 39.

The edges of the slots 275 in the ring 175 are of convex form. Thus the ring 175, which is preferably made of a synthetic material, meshes, with a clearance, with the tenons 260 of the plate 26 and gives a differential friction effect (after the clearances have been taken up). The lateral edges of the tenons 260 and slots 275 have a complementary profile. The friction damping device 174, fitted axially between the plate 20 and the plate 36, does not therefore act on the disc.

Fastening of the disc is thus protected, and it will be noted (FIG. 2) that the damping device lies mostly outward of the rivets 39 in the radial direction, with only the edges of the slots 275, 276 lying at the same radial level as the rivets.

It will be noted that the tenons 260 are joined together at their inner periphery by the sleeve portion 264. These tenons 260 therefore rigidify the sleeve portion 264 directed towards the plate 20. In this way a very strong structure is obtained, with a sleeve portion 264 which extends axially in the opposite direction with respect to the flange in the form of the sleeve 131 of the plate 20.

It will be noted that the outer periphery of the plate 26 is cut away so as to accommodate the skirt portion 22 with its disc 34, and so that the resilient device 32 can be fitted.

The thickness of the reaction plate 26 accordingly decreases in the radial direction away from the axis of the assembly.

In addition, the root zone of the sleeve portion 264 is defined by radiused portions. This gives an arrangement which is very compact in the axial direction, and very robust.

Similarly, the root zone of the hub 18 at the plate 20 is defined by rounded surface portions 304 which increase the strength of the plate 20, and which are generally, for this reason, better than the machined surfaces which are provided in the state of the art for manufacture of the components of a friction damping device (see the document U.S. Pat. No. 4,782,933).

As can be seen in FIG. 1, the radially orientated, flat, annular, inner portion 300 and outer portion 302 of the disc 36 are substantially coplanar, and they are joined together through a bend 306 which follows, with an axial clearance, the profile of the free end of the flange 131 in the form of a sleeve.

This enables any increase in the axial size of the damped flywheel to be avoided. It will be appreciated that the sleeve 1 31 also serves, ,by virtue of its outer periphery, for the engagement and centring of the sealing ring 52A, which is thus able easily to be put into precompression, like the ring 52B.

Figure 3:
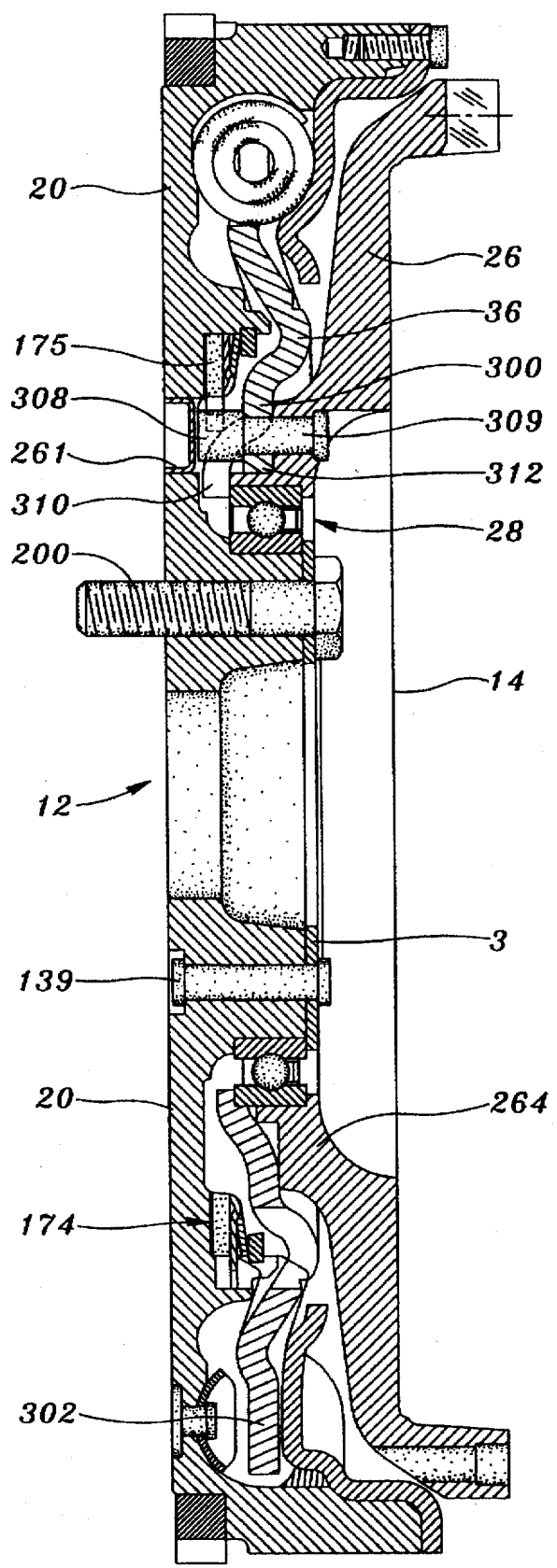
FIGS. 3 and 4 are views similar to those of FIG. 1, but show further embodiments.

In a modified embodiment shown in FIG. 3, the heads 308 of the rivets 339 by which the disc 36 is fastened to the plate 26 participate in the actuation of at least one component of the annular frictional damping device 174, such as the ring 175 in FIG. 1. To this end, it will be noted that the; heads 304 are in the form of spigots, so that they can mesh with the inner periphery of the ring 175, with the heads 308 constituting axial tenons which are engaged, with or without clearance, in mortices formed in the ring 175 at the inner periphery of the latter.

These mortices may consist of open notches, or possibly of holes. The ring 175 is thus, in this example, in the same plane as the rivet heads 308.

The radially oriented inner annular portion 300 of the disc 36 includes a set of lugs 310 which are cut out in the flat annular portion 300, and which are offset axially with respect to the plane of the latter, so as to constitute axial locating lugs for the outer ring 29 of the rolling bearing 28, to which end they cooperate with the radial end surface of the latter which faces towards the plate 20. The flat annular portion 300 thus comprises a set of locating lugs 310 spaced apart at regular intervals, which are interleaved with a set of fastening lugs 312, each of which has the body of a rivet 39 passing through it.

Machining operations in the central sleeve portion 264 of the plate 26 are accordingly considerably reduced by comparison to FIG. 1, as are the fitting and assembly operations, which no longer call for the use of a ring 5.

Figure 4:
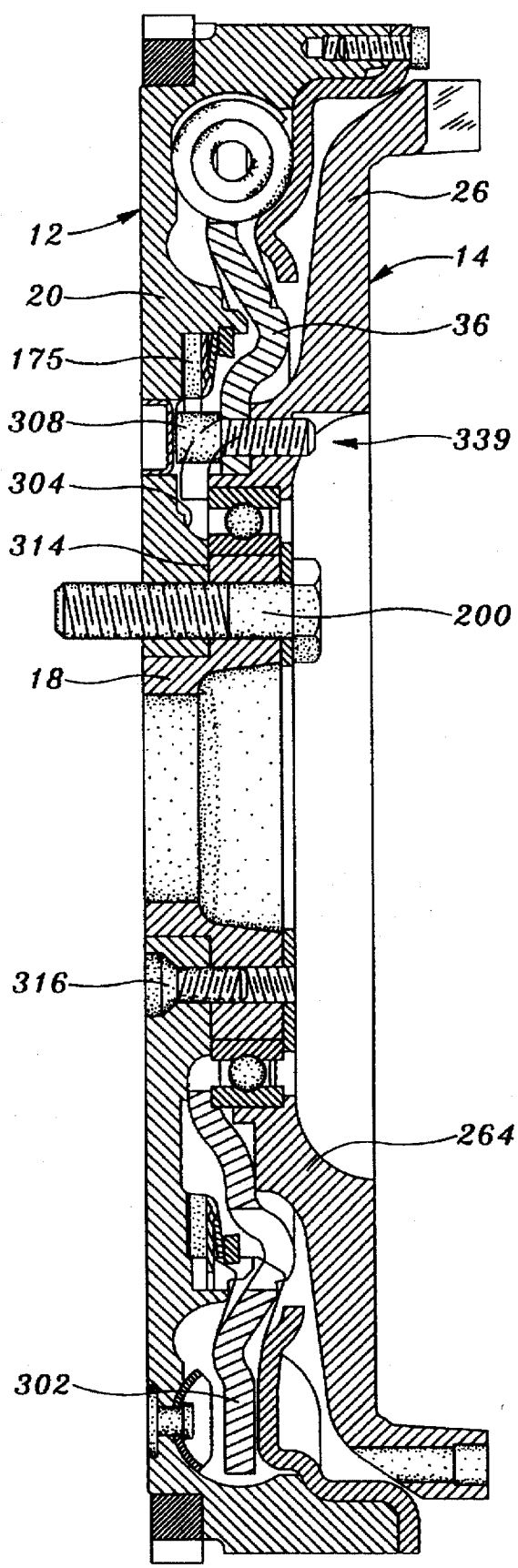

In the modification shown in FIG. 4, and with reference to FIG. 3, the rivets 39 by which the disc 36 is fastened to the plate 26 have been replaced by fastening screws 339, the heads 308 of which act in the same way as the heads of the rivets 39 in FIG. 3, and which are identical to the latter.

The hub 18 in this example is made in the form of a component attached on the central portion of the plate 20, to which it is secured by means of the studs 200.

It will however be noted that the plate 20 includes an elementary hub 314 which is joined to the plate 20 through rounded surfaces 304. The hub is thus in two parts.

We claim:

1. A torsion damper (10) comprising a first rotating element (12) and a second rotating element (14), coaxial with each other, which define between them a sealed annular housing (30) extending radially outwardly, which receives a lubricated, circumferentially acting, resilient damping device (32) which works between the two rotating elements (12, 14), the greater part of the annular housing (30) being defined by at least two components (20, 22) of a first one (12) of the two rotating elements, in which the second one (14) of the two rotating elements comprises a plate (26) and an annular disc (36) fixed to the plate by a set of fastening members (39), arranged circumferentially in the vicinity of the inner peripheral edge of the disc (36), and further comprising an annular frictional damping system (174) arranged between the first rotating element (12) and disc (36) of the second rotating element (14), wherein the greater part of the annular frictional damping system (174) is disposed radially outwardly of the zone occupied by the fastening members (39) of the disc (36), and radially inwardly with respect to the sealed annular housing (30), and in that the frictional damping system (174) is partly carried by a component, in the form of a plate (20), of the first rotating element (12) and the plate (20) of the first rotating element comprises a sleeve (131) which projects axially from the inner surface (38) of the plate (20) that faces towards the disc (36) of the second rotating element (14), and which defines an internal bore in which components (175 to 178) of the frictional damping device (174) are arranged.

2. A torsion damper according to claim 1, wherein heads (308) of the fastening members (339) cooperate with an inner periphery of a component of the frictional damping system (174) for actuation of the latter by the second rotating element (14).

3. A torsion damper according to claim 1, wherein, in axial cross section, the disc (36) of the second rotating element has a sinuous profile including a bend (306) which follows, with a clearance, the profile of the end portion of the sleeve (131) which projects on an inner face (38) of the plate (20) of the first rotating element (12).

4. A torsion damper according to claim 3, wherein the disc (36) comprises, on either side of the bend (306), a flat first annular portion (302) which extends into the said sealed annular housing (30), together with a flat second annular portion (300).

5. A torsion damper according to claim 4, wherein the said first and second flat portions (302, 300) are substantially coplanar.

6. A torsion damper according to claim 1, wherein a hub (18) is joined to the inner surface (38) of the plate (20) of the first rotating element (12) through a rounded junction zone (304).

7. A torsion damper according to claim 1, wherein the frictional damping system (174) comprises: a friction ring (175), a spacer ring (176), an axially acting resilient ring (177) which acts on the spacer ring (176) and grips the friction ring (175) between the plate (20) of the first rotating element (12) and the spacer ring (176), and the internal bore of the sleeve (131) has grooves (9), while the spacer ring (176) has at its outer periphery radial lugs for complementary engagement in the grooves (9).

8. A torsion damper according to claim 7, wherein the axially acting resilient ring (177) bears on a circlip (178) so as to act on the spacer ring (176), and said circlip (178) is fitted in the internal bore of the sleeve (131).

* * * * *